(No Model.) 6 Sheets—Sheet 1.

H. SCHMIDT, A. MERUNKA & C. J. WERNER.
CIGAR BUNCHING MACHINE.

No. 465,499. Patented Dec. 22, 1891.

(No Model.) 6 Sheets—Sheet 2.
H. SCHMIDT, A. MERUNKA & C. J. WERNER.
CIGAR BUNCHING MACHINE.

No. 465,499. Patented Dec. 22, 1891.

(No Model.) 6 Sheets—Sheet 3.

H. SCHMIDT, A. MERUNKA & C. J. WERNER.
CIGAR BUNCHING MACHINE.

No. 465,499. Patented Dec. 22, 1891.

WITNESSES:
William Goebel.
Ed. D. Miller.

INVENTORS.
Henry Schmidt,
August Merunka &
BY Charles J. Werner.
Chas. O. Gill
ATTORNEY.

(No Model.) 6 Sheets—Sheet 4.

H. SCHMIDT, A. MERUNKA & C. J. WERNER.
CIGAR BUNCHING MACHINE.

No. 465,499. Patented Dec. 22, 1891.

(No Model.) 6 Sheets—Sheet 5.
H. SCHMIDT, A. MERUNKA & C. J. WERNER.
CIGAR BUNCHING MACHINE.

No. 465,499. Patented Dec. 22, 1891.

WITNESSES:
William Goebel.
Ed. D. Miller.

INVENTORS.
Henry Schmidt,
August Merunka &
BY Charles J. Werner,
Chas. C. Gill
ATTORNEY.

(No Model.) 6 Sheets—Sheet 6.
H. SCHMIDT, A. MERUNKA & C. J. WERNER.
CIGAR BUNCHING MACHINE.
No. 465,499. Patented Dec. 22, 1891.
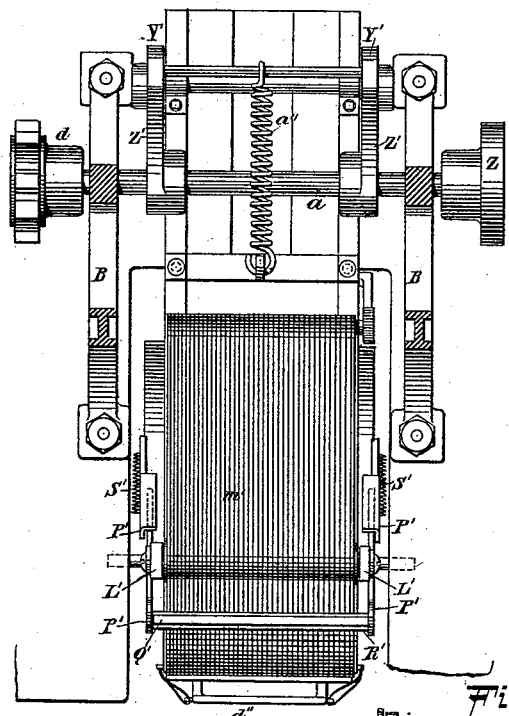
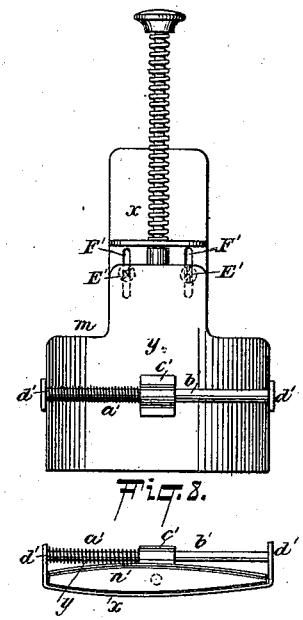
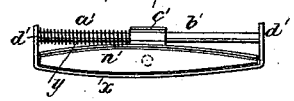
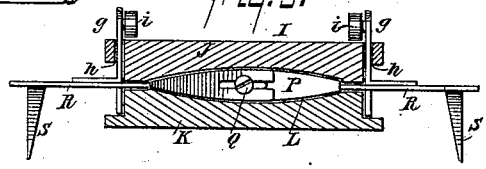
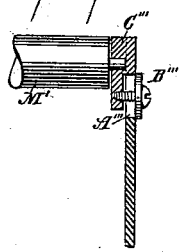
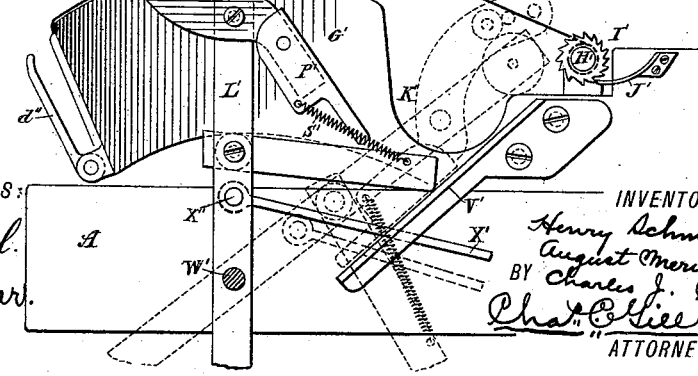

UNITED STATES PATENT OFFICE.

HENRY SCHMIDT, AUGUST MERUNKA, AND CHARLES J. WERNER, OF NEW YORK, N. Y.

CIGAR-BUNCHING MACHINE.

SPECIFICATION forming part of Letters Patent No. 465,499, dated December 22, 1891.

Application filed May 20, 1891. Serial No. 393,387. (No model.)

*To all whom it may concern:*

Be it known that we, HENRY SCHMIDT, AUGUST MERUNKA, and CHARLES J. WERNER, citizens of the United States, and residents of New York, in the county of New York and State of New York, have invented certain new and useful Improvements in Cigar-Bunching Machines, of which the following is a specification.

The invention relates to improvements in cigar-bunching machines; and it consists in the novel elements and combinations of parts hereinafter described, and particularly pointed out in the claims.

Figure 1:
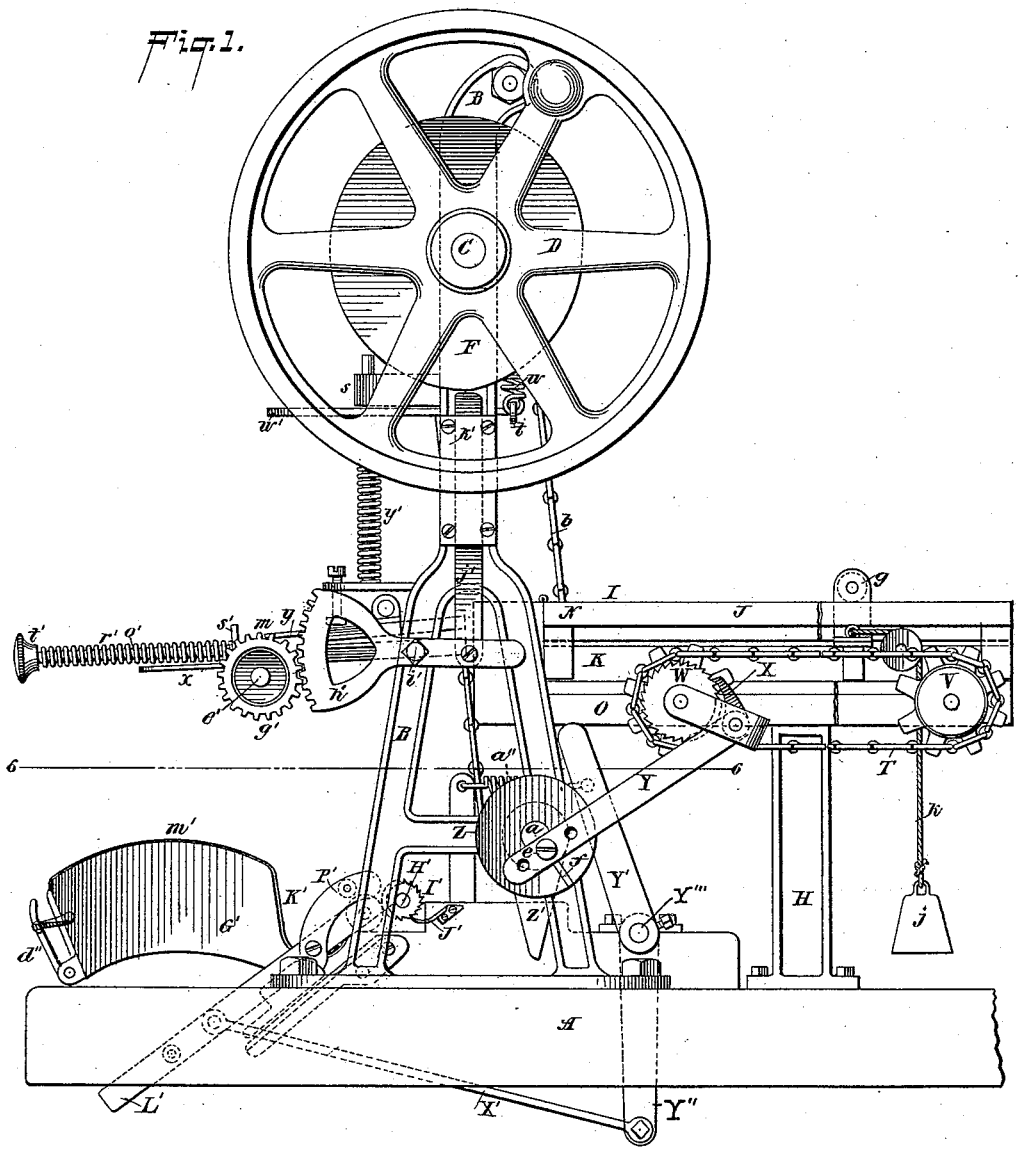
Figure 2:
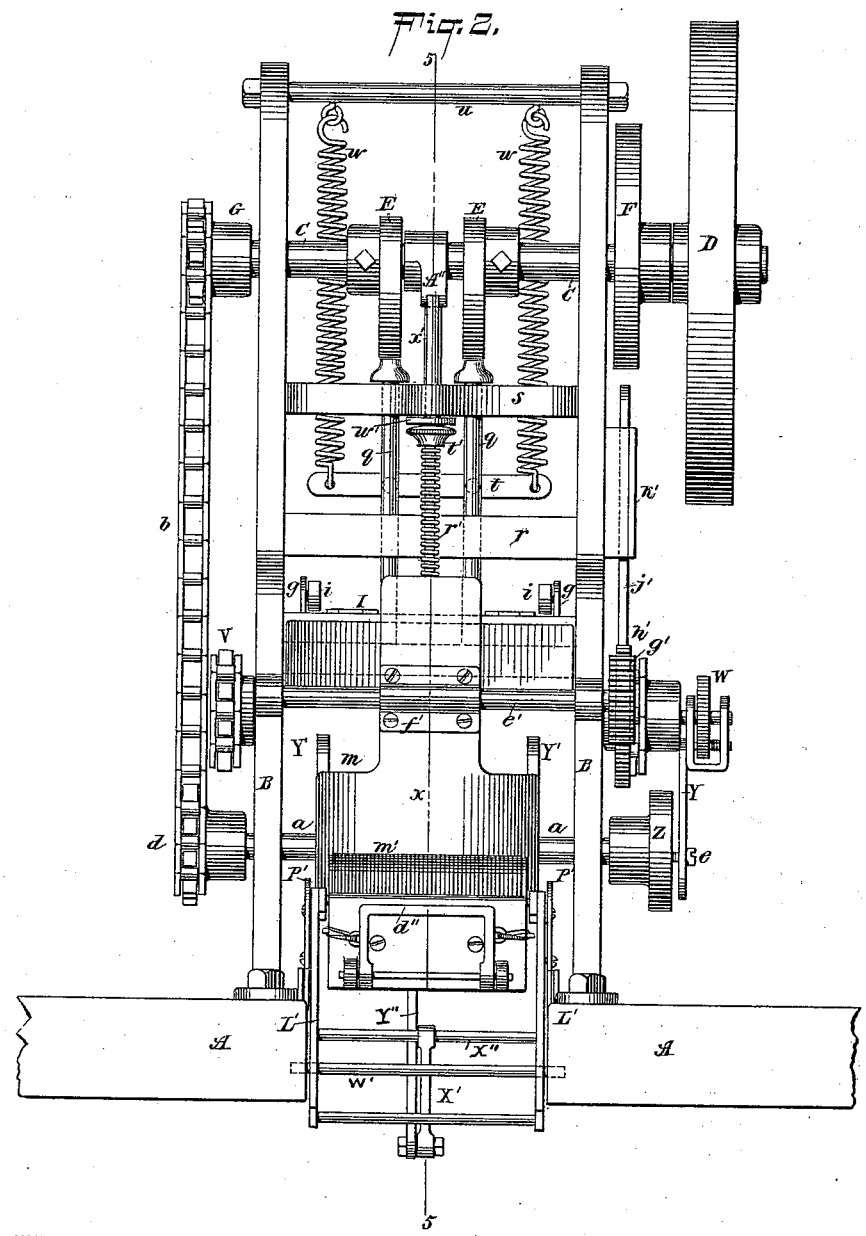
Figure 3:
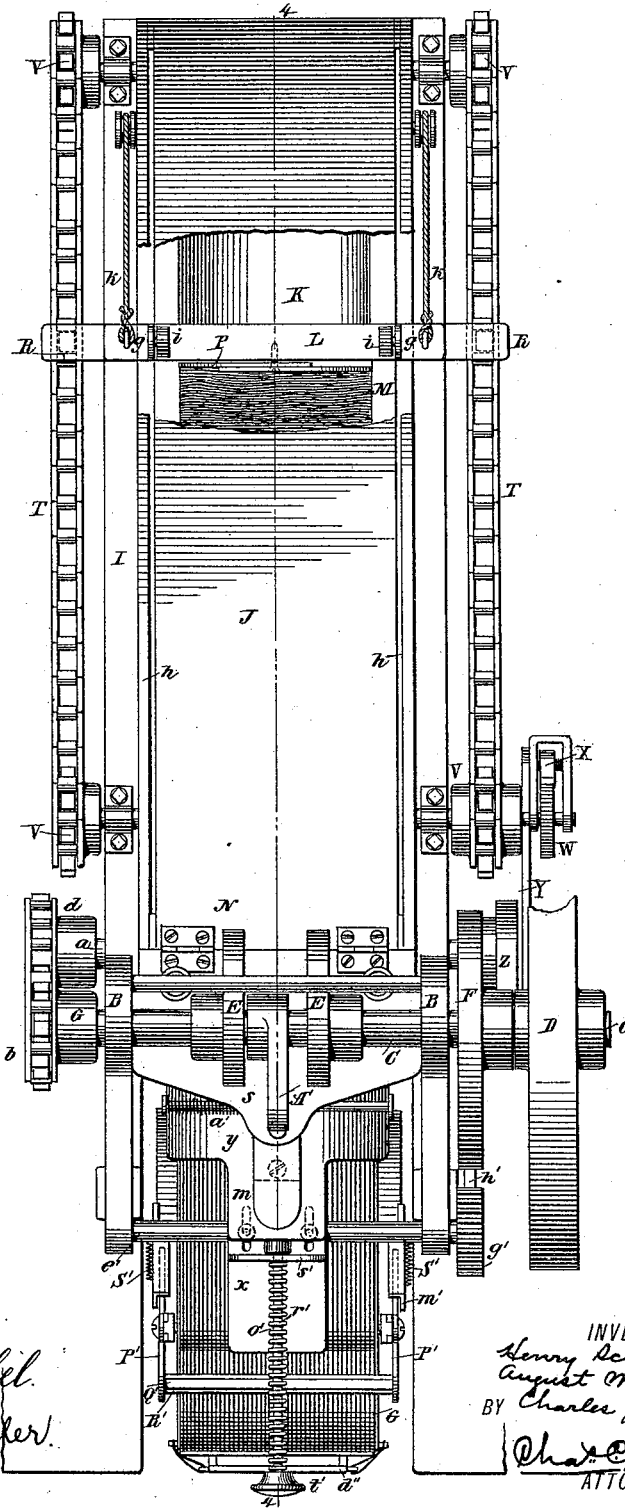
Figure 4:
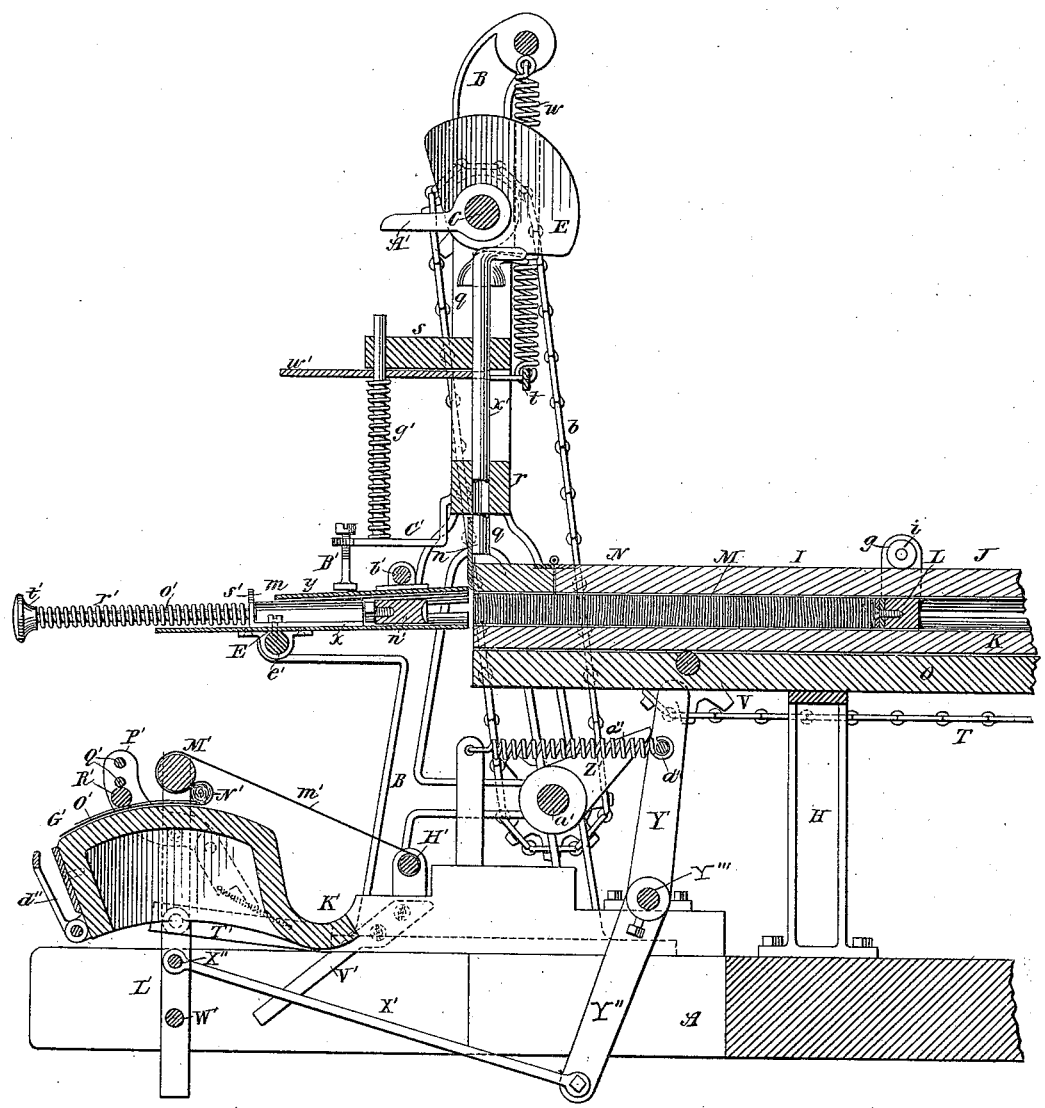
Figure 5:
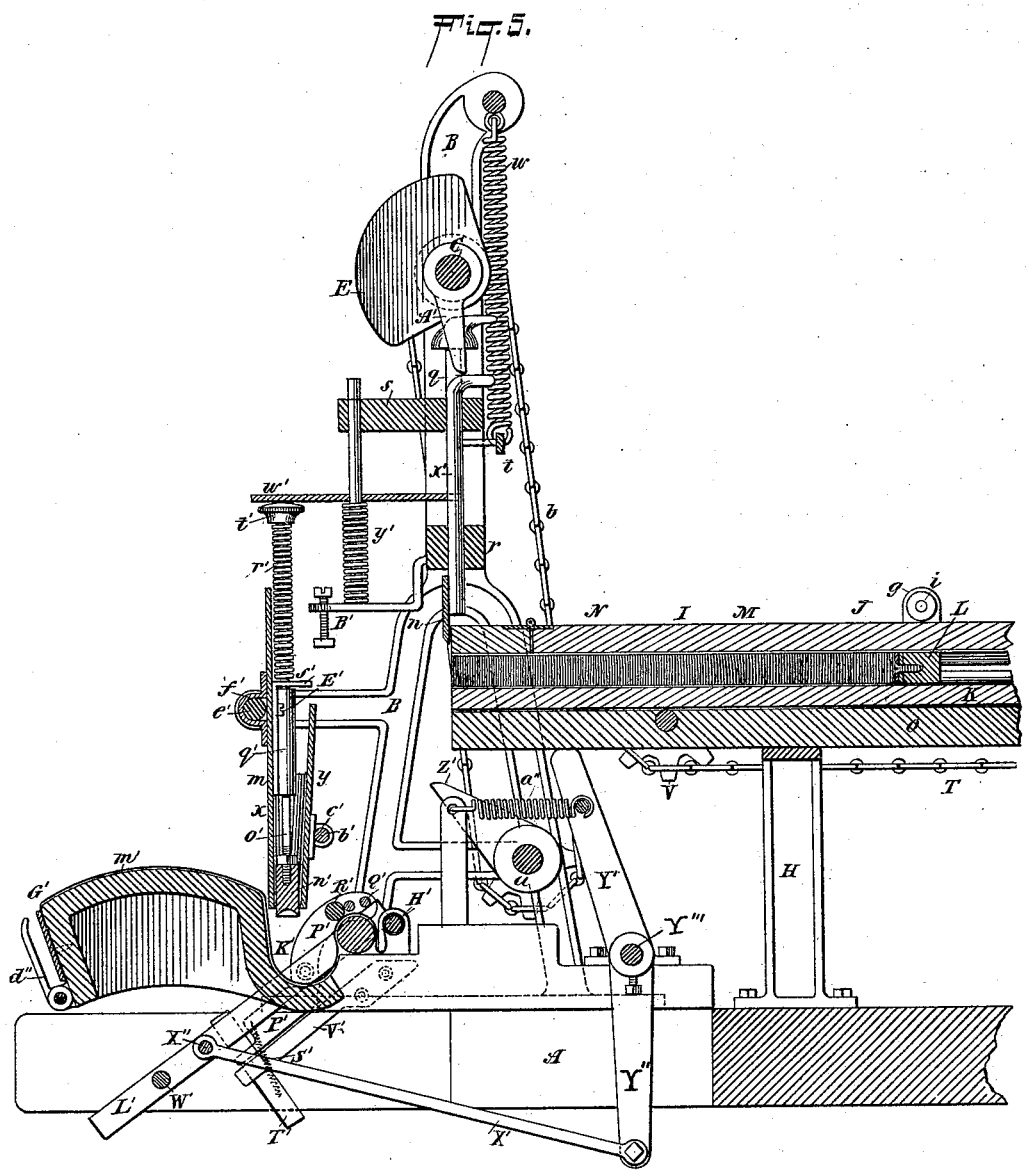

Referring to the accompanying drawings, Figure 1 is a side elevation of a machine constructed in accordance with the invention. Fig. 2 is a front elevation of same. Fig. 3 is a top view of same. Fig. 4 is a central vertical longitudinal section of same on the dotted line 4 4 of Fig. 3. Fig. 5 is a like section of same on the dotted line 5 5 of Fig. 2. Fig. 6 is a detached top view of the rolling-table, apron, and connecting mechanism, the frame of the machine being shown in section on the dotted line 6 6 of Fig. 1. Fig. 7 is a detached front elevation of the pivotally-secured funnel which receives the tobacco from the feed mechanism and conveys it to the rolling-apron. Fig. 8 is a bottom view of same. Fig. 9 is a transverse section of the feed-trough and follower thereon. Fig. 10 is a side elevation of the rolling-table, apron, and connecting mechanism. Fig. 11 is a detached view illustrating the end of the forming-roller and its means of connection with its supporting-arms.

In the drawings, A designates the table or base of the machine, and B the two main supporting-standards. Between the upper ends of the standards B B is supported the main driving-shaft C, carrying upon its end the driving-wheel D and between the standards B B the cams E E. Upon the driving-shaft C are also secured the cam F and sprocket-wheel G.

At a suitable elevation above the table A, and supported upon standards H, is provided the feed-trough I, composed of the upper and lower separable sections, (lettered J K, respectively,) which have an interior outline corresponding in cross-section with the contour of a cigar and inclose the follower L, adapted to keep the tobacco pressed forward toward the machine, for the purpose hereinafter described. The follower L has imparted to it an intermittent motion, in order that the charge of tobacco for a cigar may be fed forward at the proper time.

In Fig. 4 the tobacco is illustrated, and is lettered M.

The upper section of the feed-trough I has a hinged portion N, which may be drawn upward when desired to disclose the interior condition of the trough.

In Fig. 3 a portion of the upper section of the trough I is broken away, so as to fully disclose the position of the follower L and the mechanism by which it is carried forward against the tobacco. The width of the trough I should accord with the length it is desired the cigar shall have, and hence the sections J K are not only separable, but may be elevated from the bed O, (see Fig. 4,) so as to permit of the application to said bed of another trough having an interior outline differing from the trough illustrated in the drawings, or one adapted to make a longer cigar. The follower L, however, need not be permanently removed, since it carries upon its front face the longitudinal adjustable plates P, which may be elongated at will, so as to adapt said follower for moving forward a longer or shorter body of tobacco M.

The plates P, connected with the follower L, are illustrated more clearly in Figs. 3 and 9, the latter figure illustrating the elongated slots in said plates P, and the screw Q, by which said plates may be set in their adjusted position.

The follower L is provided at its ends with the outwardly-extending plates R, which are thin and pass between the upper and lower sections J K, respectively, of the feed-trough I, being adapted to travel along the separated edges of said sections J K without disturbing the trough I itself. The ends of the plates R R, extending outward from the follower L, are provided with the downwardly-extending projections S, which enter the links of the chains T, (see Fig. 3,) which chains are carried by the sprocket-wheels V, and when moved draw the follower L with them and carry the plates P against the body of the tobacco M, whereby the latter is gradually moved toward the machine proper. The sprocket-wheels V and chains T, with the follower L, have an intermittent motion imparted to them from the ratchet W and pawl X, the latter being carried by the upper end of the rod Y, which is secured at its lower end to the face of the wheel Z. The wheel Z is mounted upon the shaft $a$, extending between the standards B B, (see Figs. 1 and 2,) and receives its motion from the driving-shaft C, through the medium of the chain $b$ and sprocket-wheels G and $d$. The shaft $a$ has a continuous movement corresponding with that of the driving-shaft C; but said shaft $a$ imparts an intermittent movement to the sprocket-wheels V, chains T, and follower L, through the medium of the rod Y, ratchet W, and pawl X. It will appear plain that upon the rotation of the shaft $a$ and wheel Z the pawl X will be moved upward on the ratchet W a definite distance and then drawn backward again to its former position in the customary manner applicable to pawl-and-ratchet mechanism.

While we have illustrated in the drawings the pawl and ratchet for communicating an intermittent motion to the chains T and follower L from the auxiliary shaft $a$, it is to be understood that we do not confine the invention to this special mechanism for imparting this intermittent motion to the follower L. The lower end of the rod Y carries the screw $e$, whose inner end enters the radial slot or groove $f$, cut in the face of said wheel Z, and hence the lower end of the rod Y is capable of adjustment toward or from the center of said wheel Z and of having its throw increased or diminished at will, according to the particular movement it may be desired to impart to the follower L and the body of tobacco M moving before it. When it is desired to feed a greater amount of filler-tobacco with each movement of the ratchet W and sprocket-wheels V, the screw $e$ will be moved farther from the center of the wheel Z for the purpose of increasing the throw of the pawl X, and when it is desired to reduce the charge of filler-tobacco for each cigar the lower end of the rod Y will be moved nearer to the center of the wheel Z for the purpose of lessening the throw of the pawl X and decreasing the quantity of tobacco M brought forward with each movement of the follower L.

In order that during the feeding of the body of tobacco M the follower L may be regular and even in its movements and properly directed at all times, we provide the plates R (see Figs. 3 and 9) with the angle-plate standards $g$, which extend upward along the side edges of the section J and through the elongated slots $h$, formed in said upper section J, as shown in Figs. 3 and 9, and carry upon their upper ends the small wheels $i\ i$, which press lightly upon the upper surface of the section J and move with the follower L, the effect being that while the follower L forces the body of tobacco M forward or inward to the machine proper the wheels $i\ i$ and standards $g\ g$ aid in directing it. The follower L has a tension rearward or away from the machine proper by reason of the fact that said follower is provided with the counterbalance-weights $j$, the latter being connected by means of the cords $k$ with the plates R, connected with said follower. The follower L is not only carried forward by intermittent movements, but both its ends move with the same degree of speed and are kept in line with each other by reason of their connection with the parallel chains T. After the follower L has moved its entire stroke inward toward the standards B B it is then moved outward again to the outer end of the feed-trough I, so as to be in position to feed forward another body of tobacco after the same has been placed upon the lower section K. The follower L may be returned to its outer position very readily by simply freeing the pawl X from the ratchet-wheel W, since upon that being done the chains T and sprocket-wheels V will be free to move in either direction, and the counterbalance-weights $j$ will operate to draw the follower L outward again, and in so doing, through the medium of the plates R and projections S, the chains T will rapidly move with the follower.

When it is desired to place a fresh body of tobacco M in the machine, this may be accomplished by entirely removing the feed-trough I and supplying another feed-trough of similar form and construction, or the upper section J of the trough may be elevated upon its hinges and the tobacco placed upon the section K in front of the follower L, whereupon the upper section J may be lowered again, thus restoring the feeding mechanism to its normal condition, being that illustrated in the drawings. When the hinged portion N of the upper section J is turned upward on its hinges, the wheels $i$ will cause the follower L to be elevated with it, and thus render it easy to place another body of tobacco on the section K.

Each movement of the follower L projects from the inner open end of the feed-trough I a charge of tobacco sufficient for the filler of a cigar, and this charge of tobacco is caught in the pivotally-mounted funnel $m$, hereinafter more fully described, and is separated from the main body of tobacco by means of the reciprocating knife $n$, (see Fig. 5,) which knife is secured to the lower ends of the rods $q\ q$, (see Fig. 2,) said rods extending upward through the cross-bars $r\ s$ and being connected by the transverse bar $t$, suspended from the rod $u$ at the top of the standards B B by means of the springs $w$, whose purpose is to create an upward tension in the bar $t$, rods $q$, and knife $n$. It will thus be seen that the normal position of the knife $n$ is that illustrated in Figs. 4 and 5—that is, at a point above the body of tobacco M. At the time when a charge of the filler-tobacco has been projected into the funnel $m$ the cams E E on the driving-shaft C rotate against the heads of the upper ends of the rods $q$ and depress said rods and knife $n$ to the position represented in Fig. 2, thereby severing the charge of tobacco and leaving it in the funnel $m$, which funnel, operating as a hand, as hereinafter described, is then turned or oscillated downward to deliver said charge of tobacco to the rolling-apron, also hereinafter described. While the knife $n$ is cutting the charge of tobacco from the main body thereof and returning to its upward position, the follower L is at rest, and after the knife $n$ has reached its upward position and the funnel $m$ returned to its horizontal position, being that illustrated in Fig. 4, the follower L will commence to move again and feed another charge of tobacco into the open mouth of said funnel $m$ preparatory to its being again separated by the depression of the knife $n$ under the action of the cams E. After the operating-surface of the cams E have passed from contact with the upper ends of the rods $q$ the springs $w$ return said rods $q$ and knife $n$ to their upward position. The knife $n$ simply has a direct reciprocating motion, and the machine is timed so that the knife $n$ will not descend until the funnel $m$ is in the position illustrated in Fig. 4 and the follower L has moved a charge of tobacco into the open mouth of said funnel.

The funnel $m$ consists of the hinged jaws $x\ y$, provided with the spring $a'$, by which the lower ends of said jaws are kept normally closed together. The spring $a'$ is coiled upon the rod $b'$, which passes through a sleeve $c'$, secured to the outer face of the jaw $y$, and the ends of said rod $b'$ enter the lugs $d'$, formed on the jaw $x$, as illustrated more particularly in Figs. 7 and 8. The funnel $m$ is mounted upon the transverse shaft $e'$, (see Fig. 2,) being there in part secured by means of the bearing-plate $f'$. The attachment of the funnel $m$ to the shaft $e'$ is positive, and hence said funnel is only capable of movement with the shaft $e'$. The shaft $e'$ has upon one end the pinion-wheel $g'$, which is in engagement with the toothed segment $h'$, (see Fig. 1,) said segment being pivotally secured by means of the bolt $i'$ to the standard B of the machine, and being connected at its outer end with the vertical reciprocating rod $j'$. The vertical rod $j'$ has a reciprocating movement in the guide $k'$, and its upper end is in position to be engaged by the periphery of the cam-wheel F, secured upon the driving-shaft C. The purpose of the cam F, rod $j'$, pivoted segment $h'$, and pinion-wheel $g'$ is to cause the funnel $m$ to assume the horizontal position illustrated in Figs. 1 and 4, or the vertical position illustrated in Fig. 5. The funnel $m$ is given the horizontal position illustrated in Figs. 1 and 4 for the purpose of receiving the charge of filler-tobacco for a bunch, and is then moved into the vertical position illustrated in Fig. 5 for the purpose of depositing said charge upon the rolling-apron $m'$. It will be observed upon reference to Fig. 1 that the greater projecting part of the cam F is acting upon the upper end of the rod $j'$, and that when said cam is in the position illustrated the outer end of the segment $h'$ is depressed, whereby its toothed portion has been caused to move upward against the pinion-wheel $g'$ and the latter, with the shaft $e$, has thus been turned sufficiently to bring the funnel $m$ into its horizontal position. It will also be obvious that as the greater projecting portion of the cam F leaves the upper end of the rod $j'$ the weight of said funnel $m$ will tend, of its specific gravity, to reverse the movement of the shaft $e'$ and pinion $g'$, thereby returning the toothed portion of the segment $h'$ to its lower position and causing the rod $j'$ to move upward in the guide $k'$. Thus it will be noted that the movement of the funnel $m$ from its vertical position to the horizontal position is effected by the cam F acting through the rod $j'$, segment $h'$, and pinion-wheel $g'$, and that the return of said funnel $m$ to its vertical position is accomplished by simply releasing the pressure against the upper end of the rod $j'$ and permitting the weight of the inner or mouth end of the funnel $m$ to reverse the movement of the shaft $e'$ and pinion-wheel $g'$.

Within the funnel $m$ is provided the plunger $n'$, which has a concave lower surface, as illustrated in Fig. 5, and is secured upon the lower end of the rod $o'$, which extends upward through the sleeve $q'$, and is encompassed by the coiled spring $r'$, which spring has for its bearing at its lower end the lug or plate $s'$, and is retained upon the upper portion of the rod $o'$ by means of the head $t'$. The purpose of the plunger $n'$ is to force the charge of tobacco out of the funnel in position for it to be rolled with the usual binder into a bunch upon the apron $m'$, and its return movement is accomplished by means of the spring $r'$, which preserves the plunger normally within the funnel $m$, as illustrated in Fig. 4. While the funnel $m$ is in its horizontal position the spring $r'$ will be unrestrained and will retain, while in that condition, the plunger $n'$ within the funnel $m$ in order that the proper charge of tobacco may pass from the feed-trough I between the jaws $x\ y$ of said funnel, and upon the funnel $m$ assuming the vertical position illustrated in Fig. 5 the head $t'$ will appear below the arm $w'$, which is secured to the rod $x'$, as illustrated in Figs. 2 and 4, and said rod $x'$ is adapted to have a movement upward under the tension of the spring $y'$, and a movement downward under the action of the dog A', secured upon the driving-shaft C. When the funnel $m$ is first moved into its vertical position with a charge of tobacco between the jaws $x\ y$, the arm $w'$ is at a sufficient elevation, however, to be entirely free from the head $t'$; but under the timing of the machine, the parts being in motion, the dog A' turns upon the upper end of the rod $x'$ and depresses the same, and thereby the plate $w'$ is moved downward upon the head $t'$ and forces the plunger $n'$ downward, as illustrated in Fig. 5, whereby the charge of tobacco is ejected upon the binder, which rests upon the rolling-apron $m'$. After the dog A' has passed from contact with the rod $x'$ the spring $y'$ will elevate the plate $w'$ and permit the spring $r'$ to retract the plunger $n'$ into the funnel $m$, whereupon the funnel will again be turned upward into its horizontal position preparatory to receiving another charge of tobacco from the trough I. The plunger $n'$ is secured to the rod $o'$ by means of a lock-nut and screw, as illustrated in Fig. 5, and said nut and screw permit of the adjustment of the plunger within the funnel in order that its position therein may be regulated to conform with the quantity of tobacco it is desired each bunch shall have. By adjusting the plunger $n'$ within the funnel $m$ a proper space may be provided between the lower surface of the plunger and the open end of the funnel to receive an appropriate charge of tobacco for the bunch, it being intended that said space shall only be sufficient to snugly receive said charge.

As will be understood from the foregoing description, the jaws $x$ $y$ of the funnel $m$ are pivotally secured by means of the rod $b'$ and lugs $d'$, and it is upon the ends of the rod $b'$ that the jaw $y$ opens and closes. The closing of the jaws $x$ $y$ is effected by the coiled spring $a'$, and the opening of said jaws is effected by means of the stop B', secured to a plate C', extending from the cross-bar $r$.

As will be observed upon reference to Fig. 4, when the funnel $m$ is turned or oscillated upward into its horizontal position, the outer end of the jaw $y$ of said funnel will be brought into contact with the lower end of the stop B', and the pressure thereby exerted upon said upper end of said jaw will overcome the tension of the spring $a'$ and open the inner end of said jaw $y$, thus opening the mouth of the funnel $m$ and permitting the charge of tobacco from the trough I to enter the same. As the funnel $m$ starts to descend into its vertical position the pressure of the stop B' will be immediately released and the spring $a'$ will close the jaw $y$ against the jaw $x$ and thus firmly hold the charge of tobacco during the movement of the funnel $m$ to its vertical position and until the plunger $n'$ is depressed. The depression of the plunger $n'$ also overcomes the force of the spring $a'$ and permits the jaw $y$ to open sufficiently to allow the escape of the tobacco. Said jaw $y$, however, binds upon the surface of the plunger $n'$ and immediately closes upon the retraction of the same to its former position. The jaws $x$ $y$ are therefore normally closed and are only opened to receive the charge of tobacco when the funnel $m$ is turned upward and brought into contact with the stop B' and when said funnel is at its vertical position the plunger $n'$ is forced downward to eject the charge of tobacco.

It may be desirable to regulate the distance at which the jaws $x$ $y$ will separate when the funnel $m$ is in a horizontal position in accordance with the size of the bunch it is desired to make, and if so this may be very readily accomplished by adjusting the stop B' vertically, since, as will be seen upon reference to Fig. 4, when the stop is moved upward a little it will decrease the pressure on the jaw $y$, and hence said jaw will not open quite so far as it would were the stop B' adjusted downward and the pressure increased. The vertical adjustment of the stop B' will therefore regulate the distance the jaw $y$ of the funnel will open from the jaws $x$ thereof, and we have provided the upper end of the stop B' with screw-threads and a slotted head to conveniently permit the vertical adjustment when desired. The interior outline of the funnel $m$ in cross-section will be that of the outline in cross-section of the interior of the feed-trough I—that is, in the approximate shape of a cigar, as illustrated in Fig. 8—the purpose being to preserve as far as possible the outline which is given to the compacted body of tobacco M prior to its introduction to the feed-trough I. The funnel $m$ is secured to the shaft $e'$ by means of the two screws E' passing through elongated slots F' and entering said shaft, as illustrated in Figs. 3, 4, and 7, the purpose of the elongated slots F' being to regulate the position of said funnel upon the shaft $e'$ in accordance with the nature of the tobacco being fed on the trough I and the relation it is desired the lower end of said funnel shall bear to the rolling-apron $m'$. By adjusting the funnel $m$ on the shaft $e'$ the lower end of the said funnel may be brought nearer to or farther from the apron $m'$ in accordance with the size of the bunch and the character of the tobacco used.

The apron $m'$ rests upon the segmental table G', being secured at its outer end to the front wall of said table and at its inner end upon the roller H', which is adapted to revolve and thereby to wind or unwind the apron $m'$ in accordance with the degree of slackness it is desired said apron shall have preparatory to the rolling of larger or smaller bunches. The roller H' has upon its end, as shown in Fig. 1, the ratchet-wheel I', which is engaged by the pawl J', the purpose of the pawl and ratchet being to prevent the unwinding of the apron $m'$ from the roller H', except at such time as the pawl J' may be freed from said ratchet. By reason of the roller H' the apron $m'$ may be adjusted for the rolling of bunches of different sizes. The inner end of the table G' is provided with the concavity or recess K' to receive the end of the binder, which is laid upon the apron $m'$ preparatory to the deposit thereon of the charge of filler-tobacco for a bunch from the funnel $m$. Upon opposite sides of the rolling-table G' are the pivotally-secured levers L', carrying between their upper ends the forming-roller M', which passes below the apron m' and rolls the bunch lettered N' on the upper surface of the table G', as illustrated in Fig. 4, in which figure we illustrate the said roller M' in the operation of rolling the bunch N' into the binder (lettered O') and resting upon the apron m'. Upon the levers L' are secured the segmental auxiliary levers P', which are connected across the top of the table G' by means of the rods Q' and roller R', the former being merely to connect the levers P' in order that they may have a simultaneous movement, and the latter to serve as a means for smoothing out the binder O' preparatory to its being wound around the bunch N'. The roller R', as may be seen in Fig. 4, moves in advance of the roller M' and is in near relation to the top of the table G'. The lower ends of the segmental levers P' are connected by the coiled springs S' with the arms T', carried rigidly by the levers L', and the tendency of said springs S' is to draw the lower ends of said levers P' inward and thereby to tilt the upper ends of said segmental levers downward, carrying the roller R' against the binder O' and preserving it in that relation during the reciprocating movement of the roller M'. When the levers L' and roller M' are at their normal or inward position, which is that illustrated in Fig. 5, said roller M' will rest at the inner edge of the concaved recess K', formed in the table G', and under this condition of the levers L' and roller M' the lower ends of the segmental levers P' will rest against the inclines V', as illustrated in Fig. 5, the contact of said lower ends of the levers P' with said inclines V' having the effect of closing the upper ends of the levers P' over the roller M', thus leaving the concavity K' in proper condition to receive the slack of the apron m' and the charge of tobacco to be ejected from the funnel m. The purpose of the inclines V' is merely to close the levers P' upon the levers L' at the return movement of said levers L' from the outer end of the table G'. It will be seen upon reference to Figs. 4 and 5 that when the levers L' and roller M' are moved forward, so that the latter will travel along the upper surface of the table G', the springs S' will retract the lower ends of the levers P' as soon as said levers have left their contact with the inclines V', and that under the influence of said springs S' the upper ends of said levers P' will be projected forward, as illustrated in Fig. 4, and that upon the return of the roller M' to its normal position, being that illustrated in Fig. 5, the lower ends of said levers will strike the inclines V' and be closed upon the levers L', as above explained. The levers L' are connected above the rod W', upon which they are swung by the rod X'', and said rod X'' is connected by a rod X' with the lower end of the rocking lever Y'', the upper end of which is secured to the rock-shaft Y''', carrying the rocking levers Y', which are connected by a rod so as to have a simultaneous movement, and are arranged in line with the dogs Z', secured upon the shaft a, as shown in Fig. 6. The purpose of the rocking levers Y', connecting-rod X', and dogs Z' is to effect the reciprocation of the roller M' over the surface of the table G'. It will appear plain upon reference to Figs. 1 and 4 that upon the rotation of the shaft a the dogs Z' will at regular intervals come into contact with the upper ends of the rocking levers Y' and force said ends outward thereby causing the lower end of the lever Y'' to move inward with the connecting-rod X' and force the levers L' toward the outer end of the table G', and that after the dogs Z' have passed from contact with the upper ends of the levers Y' said levers will be returned to their former position, being that illustrated in Figs. 1 and 5, by the spring a''. During the return of the levers Y' to their former position under the influence of the spring a'' the lower end of the lever Y'' will be thrown outward and will, through the medium of the connecting-rod X', draw the levers L' inward to their normal position. (Illustrated in Figs. 1 and 5.) The inward movement of the levers L' will, as above described, cause the levers P' to close upon the roller M', and hence the concavity K' will be left free to receive another charge of filler-tobacco.

In the operation of the machine the filler-tobacco M is, as above described, fed inward by the intermittent motion of the follower L, said follower having its inward movement at such time as the funnel m is in the horizontal position illustrated in Fig. 4 and the knife n is in its upward position. As soon as the charge of filler-tobacco under the action of the follower L has passed from the feed-trough I into the open mouth of the funnel m the knife n descends, severing said charge and leaving it in the funnel m, whereupon the follower L, having temporarily ceased its movement, the knife n ascends and the funnel m turns downward into the vertical position illustrated in Fig. 5, in which it will be observed that said funnel is directly over the concavity K' in the table G'. The funnel m having assumed its vertical position, the plate w' is depressed upon the head t' of the plunger-rod o', and thereby the charge of tobacco is ejected from the lower end of said funnel upon the binder O', previously placed upon the apron m' to receive it. As soon as the charge of filler-tobacco has been ejected from the funnel m the plate w' is elevated by means of the coiled spring y', and the funnel m returns to its horizontal position preparatory to receiving another charge of tobacco from the feed-trough I. In the meantime the dogs Z' come into contact with the rocking levers Y' and move the forming-roller M' forward, as above described, thereby closing the charge of filler-tobacco in the bight of the apron m' and rolling it into the bunch in the well-known manner, the roller R' traveling forward upon the binder O' and smoothing it preparatory to its being wound upon the bunch N'. When the bunch N' has reached the outer end of the table G', it will be complete and pass into the bunch-receiver d'', where it will be held until removed by the hand of the operator. As soon as the bunch is released from the rolling-apron m' the springs a'' retract the levers Y' L' and roller M' to their normal positions, whereupon another binder O' may be placed upon the apron m' preparatory to receiving the next charge of filler-tobacco, which will be carried downward immediately by the funnel m. The machine will thus continue to operate until all of the tobacco in the trough I has been consumed, and thereafter another body of tobacco M may be placed within the said trough I and the operation continued, as before.

The roller M' may be adjusted vertically, according to the size of the bunch being rolled by means of the slots A''' and screws B'''. (Shown in Fig. 11.) The slots A''' are cut in the levers L', and the adjusting-screws B''' are connected with the plates C''', carried at the ends of the roller M', and by reason of said screws and slots the relation of the roller M' to the table G' may be regulated.

The method of preparing the body of filler-tobacco M into compact form approximating in cross-section the shape of a cigar is described in United States Patent No. 459,416, granted to us September 15, 1891.

What we claim as our invention, and desire to secure by Letters Patent, is—

1. In a cigar-bunching machine, the feed-trough I, containing the body of tobacco, combined with the follower L, arranged to travel in said trough and provided with adjustable plates P and extensions or plates R, the chains T, connected with the plates R and having an intermittent motion, the knife for severing a charge of tobacco, means, substantially as described, for delivering said charge from the feed-trough, and means for rolling a cigar-bunch, substantially as and for the purposes set forth.

2. In a cigar-bunching machine, the feed-trough I, composed of the upper and lower separable sections, the follower L in said trough, the chains T, connected with the ends of said follower, mechanism, substantially as described, for imparting to said chains an intermittent motion, and the cord and weight for giving said follower a tension outward, combined with the knife for severing the charges of tobacco fed forward, and rolling mechanism for rolling the bunches, substantially as and for the purposes set forth.

3. In a cigar-bunching machine, the combination of the feed-trough I, composed of the separable sections J K, the follower L in said trough, the plates R, extending from the ends of said follower outward between said sections J K, the projections S at the ends of said plates R, the chains T, detachably engaged by said projections S, means, substantially as described, for imparting an intermittent motion to said chains, the knife for severing the charges of tobacco, and rolling mechanism for rolling the bunches, substantially as and for the purposes set forth.

4. In a cigar-bunching machine, the rolling-table G', the apron thereon, and the levers L', carrying the bunching-roller M', combined with the levers P', pivoted to and crossing said levers L', the roller R', carried by the upper ends of the levers P' in advance of said roller M', the springs S', imparting an inward tension to the lower ends of said levers P', and the inclines V', engaging the said levers P', substantially as and for the purposes set forth.

5. In a cigar-bunching machine, the combination of the feed-trough I, composed of the separable sections J K, the follower L in said trough, the plates R, extending from the ends of said follower outward between the sections J K, the projections S at the ends of said plates R, the chains T, detachably engaged by said projections S, means, substantially as described, for imparting an intermittent motion to said chains, the standards g, extending upward from the plates R, the wheels i, carried at the upper ends of said standards and traveling on the upper trough-section, the knife for severing the charges of tobacco, and rolling mechanism for rolling the bunches, substantially as and for the purposes set forth.

6. In a cigar-bunching machine, the table G', having the recess K', the apron m' on said table, the pivotally-mounted levers L', extending upward at the sides of the table, and the oscillating bunching-roller M', carried at the upper ends of said levers and being between said apron and table, combined with the folding levers P', pivotally mounted on said levers L', the oscillating roller R', carried by the levers P' in advance of the roller M' and above said apron m', and means, substantially as described, for folding the levers P' L' together preparatory to the deposit of the charge of tobacco in said recess K' and unfolding said levers from each other preparatory to the rolling of a bunch, substantially as and for the purposes set forth.

7. In a cigar-bunching machine, the funnel m, consisting of the jaws x y, pivoted to each other and both mounted to turn upon another pivot, the plunger n' within said funnel, the rod o', connected with said plunger, the spring r' for imparting an upward tension to said plunger, the spring a' for keeping the jaws x y normally closed, and the stop B' for opening said funnel, combined with feed mechanism for delivering the tobacco into the open mouth of said funnel, a knife for severing the charges of tobacco, and a rolling mechanism for rolling the bunch, substantially as and for the purposes set forth.

8. In a cigar-bunching machine, the feed-trough, the knife for severing the charges of tobacco, and the rolling mechanism, combined with the pivotally-mounted funnel $m$, adapted to carry the severed charges of tobacco from the feed-trough to the rolling mechanism, the plunger in said funnel having a spring-tension upward, the plate $w'$, having a spring-tension upward, the rod $x'$, carrying said plate, and the dog $A'$, mounted on the driving-shaft and adapted to depress said rod $x'$ and thereby to depress the plate $w'$ and said plunger, substantially as set forth.

Signed at New York, in the county of New York and State of New York, this 13th day of May, A. D. 1891.

HENRY SCHMIDT.
AUGUST MERUNKA.
CHARLES J. WERNER.

Witnesses:
CHAS. C. GILL,
ED. D. MILLER.